(12) United States Patent
French et al.

(10) Patent No.: US 8,139,698 B2
(45) Date of Patent: Mar. 20, 2012

(54) DUAL CORRELATION FRAME SYNCHRONIZATION SYSTEM AND METHOD

(75) Inventors: Catherine A. French, Olympia, WA (US); Jayesh Desai, Milpitas, CA (US)

(73) Assignee: Sigma Designs, Inc., Milpitas, CA (US)

( * ) Notice: Subject to any disclaimer, the term of this patent is extended or adjusted under 35 U.S.C. 154(b) by 988 days.

(21) Appl. No.: 12/116,186

(22) Filed: May 6, 2008

(65) Prior Publication Data

US 2009/0257483 A1    Oct. 15, 2009

Related U.S. Application Data

(60) Provisional application No. 61/044,060, filed on Apr. 11, 2008.

(51) Int. Cl.
*H04L 7/04* (2006.01)
*H04L 27/06* (2006.01)
*H04J 3/06* (2006.01)

(52) U.S. Cl. ......... 375/368; 375/340; 375/343; 370/514
(58) Field of Classification Search .............. 375/316, 375/340, 343, 354, 362–265, 368; 370/504, 370/509–514
See application file for complete search history.

(56) References Cited

U.S. PATENT DOCUMENTS 5,809,009 A * 9/1998 Matsuoka et al. ............ 370/206
2008/0225689 A1 * 9/2008 Bickerstaff et al. ........... 370/208

* cited by examiner

*Primary Examiner* — Tesfaldet Bocure
(74) *Attorney, Agent, or Firm* — Perkins Coie LLP; Aaron Wininger

(57) ABSTRACT

A system and method utilize a dual correlation, one for the synchronization pattern (sync correlation) and one for the channel equalization pattern (CE correlation), to determine where the channel equalization pattern starts and thus establish frame synchronization. The system and method compare the two correlations and decides on the start of the channel equalization symbols when the CE correlation is larger than the sync correlation.

13 Claims, 3 Drawing Sheets

DUAL CORRELATION FRAME SYNCHRONIZATION SYSTEM AND METHOD

PRIORITY REFERENCE TO PRIOR APPLICATIONS

This application claims benefit of and incorporates by reference U.S. patent application Ser. No. 61/044,060, entitled "Dual Correlation Frame Synchronization Method," filed on Apr. 11, 2008, by inventors Catherine A. French et al.

TECHNICAL FIELD

This invention relates generally to receivers and more particularly, but not exclusively, provides a system and method for frame synchronization using comparative preamble pattern correlation in receivers, such as ultra-wideband (UWB) receivers.

BACKGROUND

Many communication protocols include a preamble at the start of each data frame to be used for synchronization and channel equalization at the receiver. The preamble often consists of repeated patterns, one pattern for the synchronization section and a different pattern for the channel equalization section of the preamble, with each pattern designed for their respective functions. The purpose of the frame synchronization function within a receiver is to establish a specific boundary within the frame, such as the beginning of the channel equalization symbols, the beginning of the header, or the beginning of the user data. Typically, frame synchronization is established using some feature of the synchronization patterns. For example, the WiMedia Alliance physical layer standard for ultra wideband communications prescribes a repeated synchronization pattern where the repetitions are sometimes inverted based upon position within the preamble. The particular pattern of inverted and non-inverted symbols can then be used to establish the end of the synchronization patterns and thus achieve frame synchronization.

One drawback to this type of frame synchronization method that relies on phase changes during the synchronization portion of the preamble is that it is vulnerable to extraneous phase changes. These might be caused, for example, by perturbations within the analog portion of the transceiver.

Accordingly a new system and method are needed for frame synchronization.

SUMMARY

Embodiments of the invention provide a system and method that utilize a dual correlation, one for the synchronization pattern (sync correlation) and one for the channel equalization pattern (CE correlation), to determine where the channel equalization pattern starts and thus establish frame synchronization. The system and method compare the two correlations and decides on the start of the channel equalization symbols when the CE correlation is larger than the sync correlation. This system and method is not vulnerable to extraneous phase changes because it does not rely on phase change but on comparative correlation. The system and method can also be used to distinguish preambles of differing sizes, such as the standard preamble and short preamble used in the WiMedia standard.

For illustrative purposes, embodiments of the invention will be described using WiMedia protocol's preamble structure to describe the workings of the present invention. However, the embodiments are useful not just for the WiMedia standard but for any protocol that uses a repeated pattern preamble with two different patterns (such as one for sync and one for CE), where the patterns have low cross correlation.

In an embodiment of the invention, a method comprises: determining preamble symbol boundaries; converting I and Q portions of each preamble symbol to sign form; multiplying the converted I and Q symbols by corresponding samples of a sign version of a channel equalization pattern; multiplying the converted I and Q symbols by corresponding samples of a sign version of a synchronization pattern; summing and squaring each set of multiples; adding the I and Q channel equalization summed and squared multiples to get a channel equalization correlation; adding the I and Q synchronization summed and squared multiples to get a synchronization correlation; and determining if the channel equalization portion of a preamble has begun based on subtraction of the correlations.

In an embodiment of the invention, a system comprises a packet detection and symbol synchronization block for determining preamble symbol boundaries; and a frame synchronization block, which is communicatively coupled to the packet detection and symbol synchronization block. The frame synchronization block includes a sign block for converting I and Q portions of each preamble symbol to sign form; a first pair of sign-based multipliers, which are communicatively coupled to the sign block, for multiplying the converted I and Q symbols by corresponding samples of a sign version of a channel equalization pattern; a second pair of sign-based multipliers, which are communicatively coupled to the sign block, for multiplying the converted I and Q symbols by corresponding samples of a sign version of a synchronization pattern; a first sum block and a first squarer block, which are communicatively coupled to the first pair of multipliers, for summing and squaring the channel equalization multiples; a second sum block and a second squarer block, which are communicatively coupled to the second pair of multipliers, for summing and squaring the synchronization multiples; an adder, which is communicatively coupled to the first squarer block, for adding the I and Q channel equalization summed and squared multiples to get a channel equalization correlation; an adder, which is communicatively coupled to the second squarer block, for adding the I and Q synchronization summed and squared multiples to get a synchronization correlation; a subtraction block, which is communicatively coupled to the adders, for subtracting the correlations; and a determination block, which is communicatively coupled to the subtraction block, for determining if the channel equalization portion of a preamble has begun based on the subtraction.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
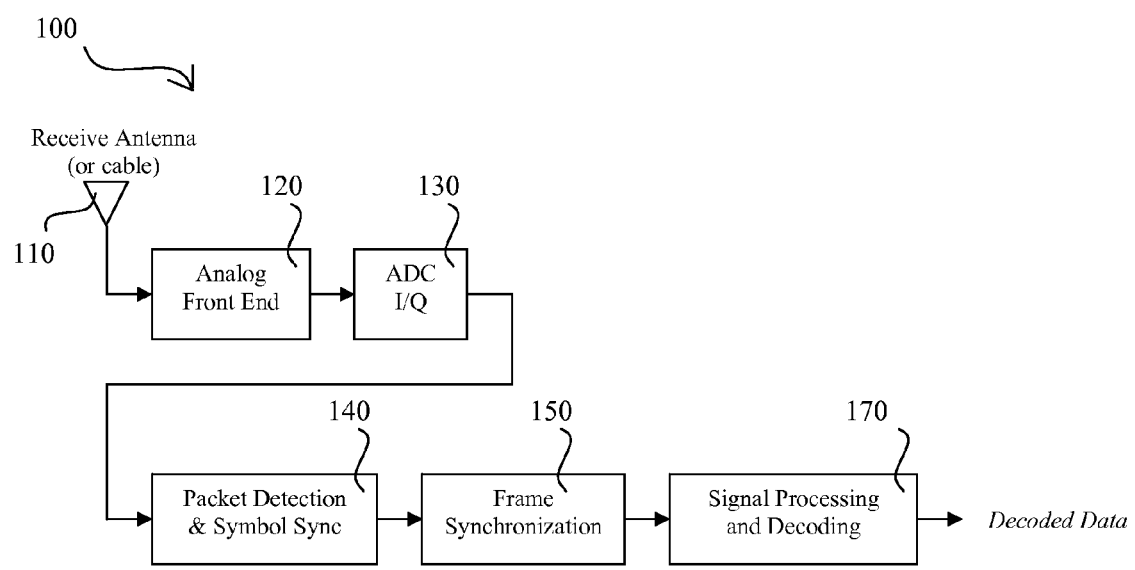
FIG. 1 is a block diagram illustrating a receiver according to an embodiment of the invention.

FIG. 1 is a block diagram illustrating a receiver 100 according to an embodiment of the invention. A radio signal enters a receiving antenna or cable 110, which is coupled, to an analog front end 120. The analog front end 120 produces in-phase and quadrature (I/Q) signals which enter an analog-to-digital converter (ADC) 130. The ADC 130 is coupled to a packet detection and symbol synchronization block 140 that detects the presence of a packet and establishes symbol boundaries. The packet detection and symbol synchronization block 140 is coupled to a frame synchronization block 150. After frame synchronization is established, the signal enters the signal processing and decoding block 170, which can include such functions as fast Fourier transform, channel equalization, frequency offset correction, and decoding in an embodiment. The output of this block 170 is the decoded data.

Figure 2:
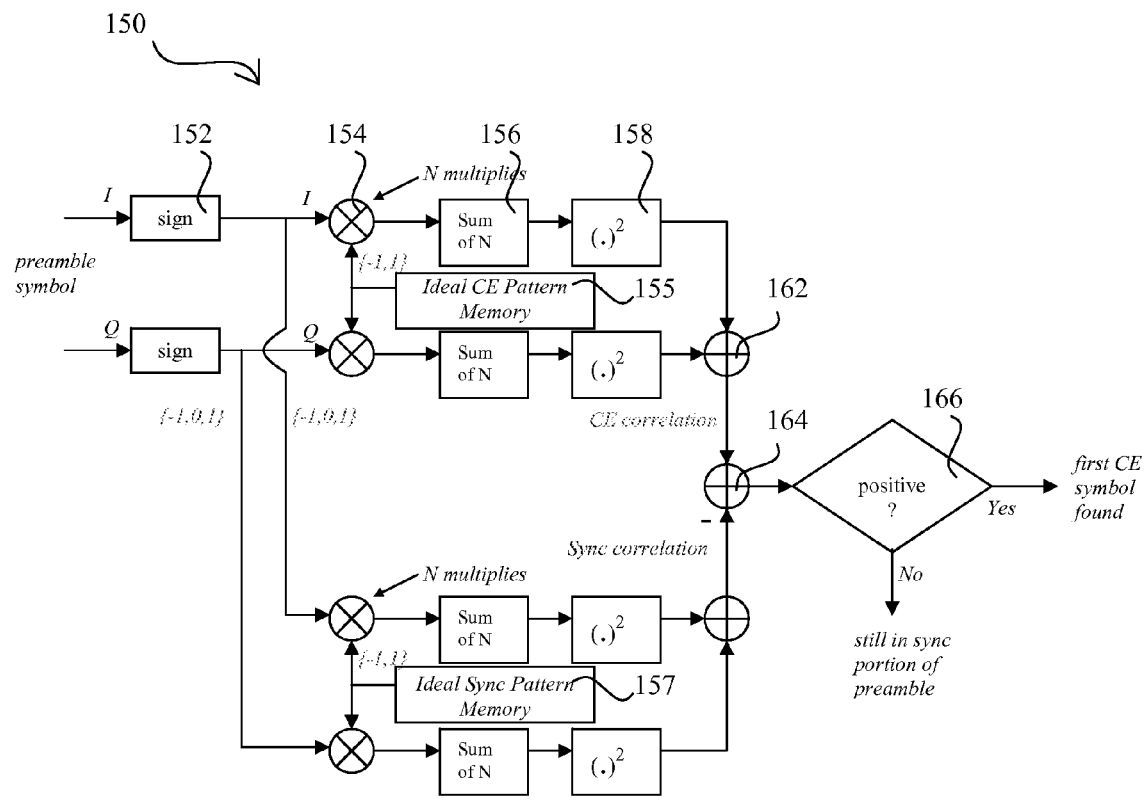
FIG. 2 is a block diagram illustrating a frame synchronization block of the receiver of FIG. 1.

FIG. 2 is a block diagram illustrating the frame synchronization block 150. The I (in-phase) and Q (quadrature) portions of each preamble symbol enter a sign block 152 and the individual samples are converted to sign form: {−1,0,1}. The N samples (N=128 for the WiMedia standard) then enter sign-based multipliers 154 and are multiplied by the corresponding samples of the sign-version of the ideal CE pattern in the time domain, stored in a memory device 155. In all cases, the results of the N multiplies are summed 156, the result enters a squaring device 158, and the squared I and Q results are fed to an adder 162 to get one CE correlation (or more precisely, the square of the magnitude of the correlation) for each symbol. At the same time, the same symbol passes through a similar sync correlation circuit using identical elements but using an ideal sync pattern stored in a memory 157 instead of an ideal CE pattern. The results of the CE and sync correlations then enter a subtractor 164, which is coupled to a device 166 to check the sign of the result of the subtraction. If the result is positive, then it is concluded that the CE portion of the preamble has begun and frame synchronization is thus established.

In this embodiment, the preamble symbol boundaries have been established by the symbol synchronization function 140 of the receiver 100 prior to entering the frame synchronization function 150. This ensures that the correlations in the frame synchronization block 150 need only be computed on a per-symbol basis and do not require a full sliding window correlator. This simplifies the design greatly.

The design is also simplified by the use of sign-based multiplication instead of full multiplication. This simplification can also contribute to better performance of the circuit since a sign-based method provides robustness to gain variations in the signal.

The CE pattern memory 155 and the sync pattern memory 157 store the sign versions of the patterns used in the preamble. For the WiMedia standard, the values to be stored are shown below in Table I. There are 10 different sync patterns that can be used in the preamble, and these are labeled PS1 through PS10. The receiver 100 has knowledge of which pattern was used, and thus chooses the appropriate pattern from memory. The WiMedia standard specifies one CE pattern, whose sign version is shown in the final column of the table below.

TABLE I

| SAMPLE | PS1 | PS2 | PS3 | PS4 | PS5 | PS6 | PS7 | PS8 | PS9 | PS10 | CE |
|---|---|---|---|---|---|---|---|---|---|---|---|
| 1 | 1 | 1 | 1 | 1 | 1 | 1 | 1 | −1 | −1 | −1 | 1 |
| 2 | −1 | −1 | 1 | 1 | 1 | −1 | 1 | −1 | −1 | 1 | −1 |
| 3 | −1 | 1 | −1 | 1 | 1 | 1 | 1 | 1 | 1 | 1 | −1 |
| 4 | −1 | 1 | 1 | −1 | −1 | 1 | −1 | 1 | 1 | 1 | 1 |
| 5 | 1 | −1 | 1 | −1 | −1 | 1 | −1 | −1 | 1 | −1 | 1 |
| 6 | 1 | −1 | −1 | 1 | −1 | 1 | −1 | 1 | 1 | 1 | 1 |
| 7 | −1 | −1 | −1 | −1 | 1 | −1 | 1 | −1 | 1 | −1 | −1 |
| 8 | 1 | −1 | −1 | −1 | −1 | −1 | −1 | −1 | −1 | 1 | 1 |
| 9 | 1 | −1 | 1 | −1 | 1 | 1 | 1 | −1 | 1 | 1 | −1 |
| 10 | −1 | 1 | 1 | −1 | 1 | −1 | 1 | −1 | 1 | −1 | 1 |
| 11 | −1 | −1 | −1 | −1 | 1 | 1 | −1 | 1 | −1 | −1 | 1 |
| 12 | −1 | −1 | 1 | 1 | −1 | 1 | −1 | 1 | 1 | −1 | −1 |
| 13 | 1 | 1 | 1 | 1 | −1 | 1 | −1 | −1 | −1 | 1 | 1 |
| 14 | 1 | 1 | −1 | −1 | −1 | −1 | −1 | 1 | −1 | −1 | −1 |
| 15 | −1 | 1 | −1 | 1 | 1 | −1 | 1 | −1 | −1 | 1 | −1 |
| 16 | 1 | −1 | −1 | 1 | −1 | −1 | −1 | 1 | 1 | 1 | −1 |
| 17 | 1 | −1 | −1 | −1 | 1 | −1 | −1 | −1 | 1 | 1 | 1 |
| 18 | −1 | 1 | −1 | 1 | 1 | −1 | −1 | −1 | −1 | −1 | −1 |
| 19 | −1 | −1 | 1 | −1 | −1 | −1 | −1 | 1 | 1 | −1 | −1 |
| 20 | −1 | −1 | −1 | 1 | −1 | −1 | 1 | 1 | −1 | −1 | −1 |
| 21 | 1 | 1 | 1 | −1 | −1 | −1 | 1 | −1 | 1 | 1 | 1 |
| 22 | 1 | 1 | 1 | −1 | −1 | 1 | 1 | 1 | 1 | −1 | −1 |
| 23 | −1 | 1 | 1 | 1 | 1 | 1 | −1 | −1 | 1 | 1 | −1 |
| 24 | 1 | −1 | 1 | 1 | −1 | 1 | 1 | 1 | −1 | 1 | 1 |
| 25 | 1 | 1 | −1 | 1 | −1 | 1 | −1 | −1 | 1 | −1 | 1 |
| 26 | −1 | 1 | −1 | 1 | −1 | −1 | −1 | −1 | 1 | 1 | −1 |
| 27 | −1 | 1 | 1 | 1 | −1 | 1 | −1 | 1 | −1 | 1 | −1 |
| 28 | −1 | −1 | −1 | −1 | 1 | 1 | 1 | 1 | 1 | 1 | −1 |
| 29 | 1 | 1 | −1 | −1 | 1 | 1 | 1 | −1 | −1 | −1 | 1 |
| 30 | 1 | 1 | 1 | 1 | 1 | −1 | 1 | 1 | −1 | 1 | 1 |

TABLE I-continued

| SAMPLE | PS1 | PS2 | PS3 | PS4 | PS5 | PS6 | PS7 | PS8 | PS9 | PS10 | CE |
|---|---|---|---|---|---|---|---|---|---|---|---|
| 31 | -1 | 1 | 1 | -1 | -1 | -1 | -1 | 1 | 1 | -1 | 1 |
| 32 | 1 | -1 | 1 | -1 | 1 | -1 | -1 | 1 | 1 | -1 | -1 |
| 33 | 1 | -1 | -1 | -1 | 1 | -1 | -1 | 1 | 1 | 1 | 1 |
| 34 | 1 | 1 | -1 | -1 | 1 | 1 | -1 | 1 | 1 | -1 | -1 |
| 35 | 1 | -1 | 1 | -1 | 1 | -1 | -1 | -1 | -1 | -1 | -1 |
| 36 | 1 | -1 | -1 | 1 | -1 | -1 | 1 | -1 | 1 | -1 | 1 |
| 37 | -1 | -1 | -1 | 1 | 1 | 1 | 1 | 1 | -1 | 1 | -1 |
| 38 | -1 | 1 | 1 | -1 | 1 | 1 | 1 | -1 | -1 | -1 | -1 |
| 39 | 1 | 1 | 1 | 1 | 1 | -1 | -1 | 1 | -1 | 1 | 1 |
| 40 | -1 | -1 | 1 | -1 | 1 | 1 | 1 | -1 | 1 | 1 | 1 |
| 41 | -1 | 1 | 1 | 1 | -1 | 1 | -1 | -1 | 1 | 1 | -1 |
| 42 | 1 | 1 | 1 | 1 | 1 | -1 | -1 | -1 | -1 | 1 | 1 |
| 43 | 1 | -1 | -1 | 1 | -1 | 1 | 1 | 1 | 1 | -1 | -1 |
| 44 | 1 | -1 | 1 | -1 | -1 | 1 | 1 | 1 | -1 | -1 | -1 |
| 45 | -1 | 1 | 1 | -1 | 1 | 1 | 1 | -1 | 1 | 1 | -1 |
| 46 | -1 | 1 | -1 | 1 | -1 | -1 | 1 | 1 | 1 | -1 | -1 |
| 47 | 1 | 1 | -1 | -1 | 1 | -1 | -1 | -1 | 1 | 1 | 1 |
| 48 | -1 | -1 | -1 | -1 | -1 | -1 | 1 | 1 | -1 | 1 | -1 |
| 49 | 1 | 1 | -1 | 1 | -1 | 1 | 1 | 1 | 1 | -1 | 1 |
| 50 | -1 | -1 | -1 | -1 | 1 | 1 | 1 | 1 | 1 | 1 | -1 |
| 51 | -1 | 1 | 1 | -1 | -1 | -1 | 1 | -1 | -1 | 1 | -1 |
| 52 | -1 | 1 | -1 | 1 | -1 | -1 | -1 | -1 | 1 | 1 | 1 |
| 53 | 1 | -1 | -1 | 1 | -1 | -1 | 1 | -1 | 1 | -1 | 1 |
| 54 | 1 | -1 | 1 | -1 | 1 | -1 | -1 | -1 | -1 | 1 | 1 |
| 55 | -1 | -1 | 1 | 1 | 1 | 1 | 1 | 1 | -1 | -1 | 1 |
| 56 | 1 | 1 | 1 | -1 | 1 | -1 | -1 | -1 | 1 | 1 | 1 |
| 57 | 1 | -1 | 1 | -1 | 1 | -1 | 1 | -1 | 1 | 1 | 1 |
| 58 | -1 | 1 | -1 | 1 | -1 | -1 | 1 | -1 | 1 | -1 | 1 |
| 59 | -1 | -1 | 1 | -1 | -1 | 1 | -1 | 1 | -1 | -1 | -1 |
| 60 | -1 | -1 | -1 | 1 | 1 | 1 | 1 | 1 | 1 | -1 | -1 |
| 61 | 1 | 1 | -1 | 1 | 1 | 1 | 1 | -1 | 1 | 1 | 1 |
| 62 | 1 | 1 | 1 | -1 | 1 | -1 | 1 | 1 | -1 | -1 | -1 |
| 63 | -1 | 1 | 1 | 1 | -1 | -1 | -1 | -1 | -1 | 1 | -1 |
| 64 | 1 | -1 | 1 | -1 | 1 | -1 | 1 | 1 | 1 | 1 | -1 |
| 65 | -1 | 1 | -1 | 1 | 1 | 1 | -1 | 1 | 1 | -1 | -1 |
| 66 | 1 | -1 | 1 | 1 | -1 | -1 | 1 | 1 | 1 | 1 | 1 |
| 67 | 1 | 1 | 1 | 1 | 1 | 1 | -1 | -1 | -1 | -1 | 1 |
| 68 | 1 | 1 | -1 | -1 | 1 | 1 | 1 | -1 | 1 | 1 | 1 |
| 69 | -1 | -1 | -1 | -1 | -1 | 1 | 1 | 1 | -1 | 1 | 1 |
| 70 | -1 | -1 | 1 | 1 | -1 | 1 | -1 | -1 | -1 | 1 | -1 |
| 71 | 1 | -1 | 1 | -1 | 1 | -1 | -1 | 1 | -1 | 1 | 1 |
| 72 | -1 | 1 | 1 | -1 | -1 | -1 | 1 | -1 | 1 | 1 | 1 |
| 73 | -1 | -1 | 1 | 1 | -1 | -1 | 1 | -1 | -1 | 1 | 1 |
| 74 | 1 | 1 | 1 | 1 | 1 | 1 | 1 | -1 | 1 | -1 | 1 |
| 75 | 1 | -1 | -1 | 1 | -1 | -1 | 1 | 1 | 1 | -1 | -1 |
| 76 | 1 | -1 | 1 | -1 | 1 | -1 | -1 | 1 | -1 | -1 | -1 |
| 77 | -1 | 1 | 1 | -1 | 1 | -1 | -1 | -1 | 1 | 1 | -1 |
| 78 | -1 | 1 | -1 | 1 | 1 | 1 | -1 | 1 | 1 | -1 | -1 |
| 79 | 1 | 1 | -1 | 1 | -1 | 1 | 1 | -1 | 1 | 1 | -1 |
| 80 | -1 | -1 | -1 | -1 | 1 | 1 | -1 | 1 | -1 | 1 | -1 |
| 81 | 1 | -1 | -1 | -1 | 1 | -1 | -1 | -1 | 1 | -1 | -1 |
| 82 | -1 | -1 | 1 | -1 | 1 | 1 | -1 | -1 | 1 | 1 | 1 |
| 83 | -1 | -1 | 1 | -1 | 1 | 1 | -1 | 1 | -1 | 1 | -1 |
| 84 | -1 | -1 | -1 | 1 | -1 | 1 | 1 | 1 | 1 | 1 | 1 |
| 85 | 1 | 1 | -1 | 1 | -1 | 1 | 1 | -1 | -1 | -1 | 1 |
| 86 | 1 | 1 | 1 | 1 | -1 | 1 | 1 | 1 | 1 | -1 | 1 |
| 87 | -1 | 1 | 1 | 1 | 1 | -1 | -1 | 1 | -1 | -1 | 1 |
| 88 | 1 | -1 | 1 | 1 | -1 | 1 | 1 | 1 | 1 | -1 | 1 |
| 89 | -1 | 1 | -1 | -1 | 1 | 1 | 1 | 1 | 1 | 1 | -1 |
| 90 | 1 | -1 | -1 | -1 | 1 | -1 | -1 | 1 | 1 | 1 | 1 |
| 91 | 1 | 1 | 1 | -1 | 1 | 1 | 1 | -1 | -1 | -1 | -1 |
| 92 | 1 | 1 | -1 | 1 | -1 | 1 | -1 | -1 | 1 | 1 | 1 |
| 93 | -1 | -1 | -1 | 1 | -1 | 1 | 1 | 1 | -1 | -1 | 1 |
| 94 | -1 | -1 | 1 | -1 | -1 | -1 | -1 | -1 | -1 | 1 | 1 |
| 95 | 1 | -1 | 1 | 1 | 1 | 1 | 1 | -1 | -1 | 1 | 1 |
| 96 | -1 | 1 | 1 | 1 | -1 | -1 | -1 | 1 | -1 | 1 | 1 |
| 96 | -1 | 1 | 1 | 1 | -1 | -1 | -1 | 1 | -1 | 1 | 1 |
| 97 | 1 | 1 | 1 | -1 | -1 | 1 | -1 | -1 | 1 | -1 | -1 |
| 98 | -1 | 1 | -1 | -1 | -1 | -1 | -1 | -1 | 1 | 1 | 1 |
| 99 | -1 | 1 | -1 | -1 | 1 | -1 | 1 | 1 | -1 | 1 | 1 |
| 100 | -1 | 1 | 1 | 1 | 1 | 1 | 1 | 1 | 1 | 1 | -1 |
| 101 | 1 | -1 | 1 | 1 | 1 | 1 | -1 | -1 | -1 | 1 | -1 |
| 102 | 1 | 1 | 1 | 1 | -1 | 1 | -1 | -1 | -1 | 1 | 1 |
| 103 | -1 | -1 | -1 | 1 | -1 | -1 | -1 | -1 | -1 | 1 | 1 |
| 104 | 1 | 1 | 1 | 1 | 1 | 1 | 1 | 1 | 1 | -1 | 1 |
| 105 | -1 | -1 | -1 | -1 | 1 | 1 | 1 | -1 | -1 | 1 | 1 |
| 106 | 1 | 1 | -1 | -1 | -1 | -1 | 1 | -1 | -1 | -1 | 1 |
| 107 | 1 | -1 | 1 | -1 | 1 | 1 | 1 | 1 | 1 | -1 | -1 |

TABLE I-continued

| SAMPLE | PS1 | PS2 | PS3 | PS4 | PS5 | PS6 | PS7 | PS8 | PS9 | PS10 | CE |
|---|---|---|---|---|---|---|---|---|---|---|---|
| 108 | 1 | −1 | −1 | 1 | −1 | 1 | −1 | 1 | −1 | −1 | 1 |
| 109 | −1 | 1 | −1 | 1 | −1 | 1 | −1 | 1 | 1 | 1 | 1 |
| 110 | −1 | 1 | 1 | −1 | −1 | −1 | −1 | 1 | 1 | −1 | −1 |
| 111 | 1 | 1 | 1 | 1 | 1 | −1 | 1 | −1 | −1 | 1 | 1 |
| 112 | −1 | −1 | 1 | 1 | −1 | −1 | −1 | 1 | −1 | 1 | 1 |
| 113 | 1 | −1 | 1 | −1 | −1 | −1 | −1 | 1 | −1 | −1 | 1 |
| 114 | −1 | 1 | 1 | −1 | −1 | 1 | −1 | 1 | −1 | −1 | 1 |
| 115 | −1 | −1 | −1 | −1 | −1 | −1 | −1 | −1 | 1 | −1 | 1 |
| 116 | −1 | −1 | 1 | 1 | 1 | −1 | 1 | −1 | −1 | −1 | 1 |
| 117 | 1 | 1 | 1 | 1 | 1 | −1 | 1 | 1 | 1 | 1 | 1 |
| 118 | 1 | 1 | −1 | −1 | 1 | −1 | 1 | −1 | 1 | −1 | −1 |
| 119 | −1 | 1 | −1 | 1 | −1 | 1 | −1 | 1 | 1 | −1 | 1 |
| 120 | 1 | −1 | −1 | 1 | 1 | 1 | 1 | −1 | −1 | 1 | −1 |
| 121 | 1 | 1 | 1 | 1 | −1 | −1 | −1 | 1 | −1 | 1 | 1 |
| 122 | −1 | −1 | 1 | −1 | 1 | −1 | 1 | −1 | −1 | −1 | −1 |
| 123 | −1 | 1 | −1 | 1 | −1 | −1 | 1 | −1 | 1 | −1 | 1 |
| 124 | −1 | 1 | 1 | −1 | 1 | −1 | 1 | −1 | −1 | −1 | 1 |
| 125 | 1 | −1 | 1 | −1 | 1 | −1 | 1 | 1 | 1 | 1 | −1 |
| 126 | 1 | −1 | −1 | 1 | 1 | 1 | 1 | −1 | 1 | −1 | −1 |
| 127 | −1 | −1 | −1 | −1 | −1 | 1 | −1 | −1 | 1 | 1 | −1 |
| 128 | 1 | 1 | −1 | −1 | 1 | 1 | 1 | −1 | −1 | 1 | 1 |

Figure 3:
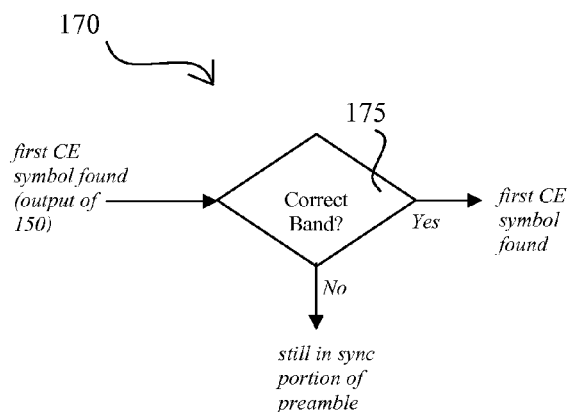
FIG. 3 is a block diagram of a band checking circuit that reduces the probability of a false alarm during synchronization.

FIG. 3 is a block diagram of a band checking circuit 170 that reduces the probability of a false alarm during synchronization. In an embodiment, the band checking circuit 175 is a component of the frame synchronization block 150.

Frame synchronization methods in general must balance two probabilities: the probability of false alarm, whereby a frame boundary is established where none actually exists; and the probability of miss, whereby no frame boundary is found when one is present. The band checking circuit 175 lowers the probability of false alarm for the particular case of the WiMedia standard by including an optional test that determines whether the frame boundary occurred during a symbol where such a boundary is expected. Specifically, the WiMedia standard includes frequency hopping such that the period-6 hopping pattern aligns exactly with the 6-symbol CE patterns in the preamble. Thus, the band-checking circuit 175 reduces the probability of false alarm by checking that the first CE symbol found using this frame synchronization method is in the correct band. For the WiMedia standard, the correct frequency bands for the first CE symbol for frequency hopping patterns 1-10, respectively, are: [1 1 1 1 1 2 3 1 1 2].

Figure 4:
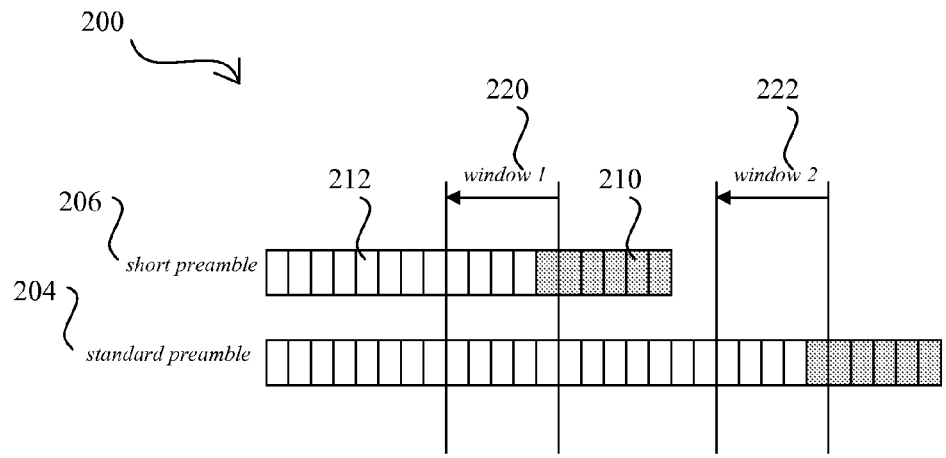
FIG. 4 is a diagram illustrating preambles.

FIG. 4 illustrates two different preamble lengths 200. These are the two preambles used in the WiMedia standard, called the standard preamble 204 and the short (or burst) preamble 206. The blocks 210 and 212 represent symbols or patterns, with shaded blocks 210 representing the CE pattern and unshaded blocks 212 representing the sync pattern. Also shown are programmable-sized windows 220, 222 that include the first CE symbol and zero or more sync symbols.

Figure 5:
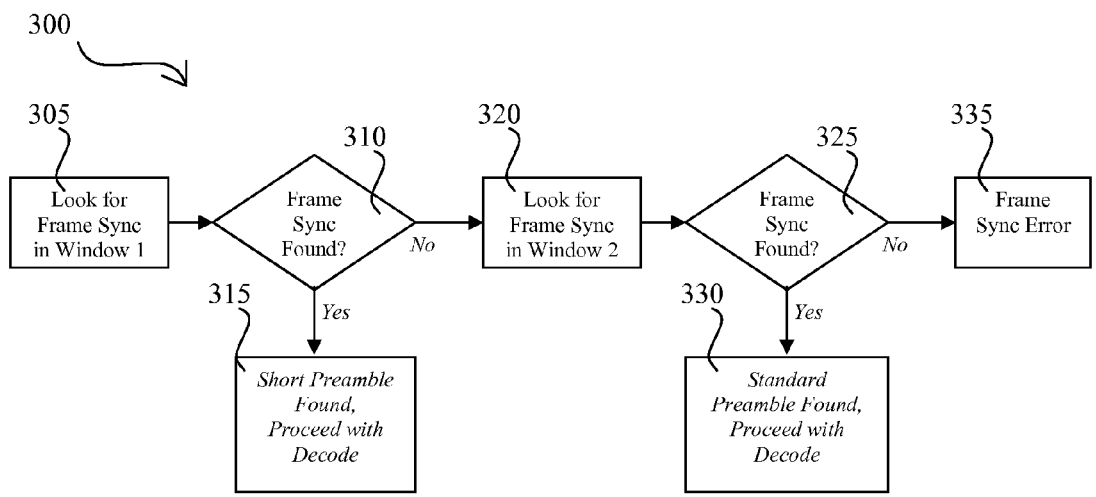
FIG. 5 is a flowchart illustrating a method of frame synchronization when two preamble sizes are allowed.

FIG. 5 is a flowchart illustrating a method 300 of frame synchronization. The method 300 looks for the CE symbols in two different windows within the preamble to account for the occurrence of standard or short preambles. The method 300 starts by looking 305 for frame synchronization in the first window and tests whether sync was found 310. If found 310, the method 300 decides on the short preamble and proceeds with the decode 315. Otherwise the method 300 looks 320 for a frame sync in the second window for a standard preamble and tests whether sync was found 325. If found, the method 300 decides on the standard preamble and proceeds with the decode 330. If frame sync is not found in either window, a frame synchronization error is indicated 335. In an embodiment, this method is performed by the frame synchronization circuit 150.

The foregoing description of the illustrated embodiments of the present invention is by way of example only, and other variations and modifications of the above-described embodiments and methods are possible in light of the foregoing teaching. For example, embodiments can include any protocol using a repeated pattern preamble. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   determining preamble symbol boundaries;
   converting I and Q portions of each preamble symbol to sign form;
   multiplying the converted I and Q symbols by corresponding samples of a sign version of a channel equalization pattern;
   multiplying the converted I and Q symbols by corresponding samples of a sign version of a synchronization pattern;
   summing and squaring each set of multiples;
   adding the I and Q channel equalization summed and squared multiples to get a channel equalization correlation;
   adding the I and Q synchronization summed and squared multiples to get a synchronization correlation; and
   determining if the channel equalization portion of a preamble has begun based on subtraction of the correlations.

2. The method of claim 1, wherein the channel equalization multiplying and the synchronization multiplying are done substantially simultaneously.

3. The method of claim 1, further comprising confirming a frame boundary by:
   determining a frequency band; and
   checking if a first channel equalization symbol found was transmitted in an expected frequency.

4. The method of claim 1, wherein the preamble complies with the Wimedia standard and wherein the method further comprises:

determining if a preamble is a short or standard preamble and decoding accordingly.

5. The method of claim 4, wherein the determining if a preamble is a short or standard preamble and decoding comprises:
   determining if a frame synchronization is found in a first window and decoding based on a short preamble; and
   determining if a frame synchronization is found in a second window and decoding based on a standard preamble if the frame synchronization was not found in the first window.

6. A system, comprising:
   means for determining preamble symbol boundaries;
   means for converting I and Q portions of each preamble symbol to sign form;
   means for multiplying the converted I and Q symbols by corresponding samples of a sign version of a channel equalization pattern;
   means for multiplying the converted I and Q symbols by corresponding samples of a sign version of a synchronization pattern;
   means for summing and squaring each set of multiples;
   means for adding the I and Q channel equalization summed and squared multiples to get a channel equalization correlation;
   means for adding the I and Q synchronization summed and squared multiples to get a synchronization correlation; and
   means for determining if the channel equalization portion of a preamble has begun based on subtraction of the correlations.

7. A system, comprising:
   a packet detection and symbol synchronization block for determining preamble symbol boundaries; and
   a frame synchronization block, communicatively coupled to the packet detection and symbol synchronization block, comprising
      a sign block for converting I and Q portions of each preamble symbol to sign form;
      a first pair of sign-based multipliers, communicatively coupled to the sign block, for multiplying the converted I and Q symbols by corresponding samples of a sign version of a channel equalization pattern;
      a second pair of sign-based multipliers, communicatively coupled to the sign block, for multiplying the converted I and Q symbols by corresponding samples of a sign version of a synchronization pattern;
      a first sum block and a first squarer block, communicatively coupled to the first pair of multipliers, for summing and squaring the channel equalization multiples;
      a second sum block and a second squarer block, communicatively coupled to the second pair of multipliers, for summing and squaring the synchronization multiples;
      an adder, communicatively coupled to the first squarer block, for adding the I and Q channel equalization summed and squared multiples to get a channel equalization correlation;
      an adder, communicatively coupled to the second squarer block, for adding the I and Q synchronization summed and squared multiples to get a synchronization correlation;
      a subtraction block, communicatively coupled to the adders, for subtracting the correlations; and
      a determination block, communicatively coupled to the subtraction block, for determining if the channel equalization portion of a preamble has begun based on the subtraction.

8. The system of claim 7, wherein the multipliers perform the channel equalization multiplying and the synchronization multiplying substantially simultaneously.

9. The system of claim 7, wherein the frame synchronization block further comprises a band checking circuit that confirms a frame boundary by:
   determining a frequency band; and
   checking if a first channel equalization symbol found was transmitted in an expected frequency.

10. The system of claim 7, wherein the preamble complies with the Wimedia standard and wherein the frame synchronization block further determines if a preamble is a short or standard preamble and decoding accordingly.

11. The system of claim 10, wherein the frame synchronization block further determines if a preamble is a short or standard preamble and decoding by:
   determining if a frame synchronization is found in a first window and decoding based on a short preamble; and
   determining if a frame synchronization is found in a second window and decoding based on a standard preamble if the frame synchronization was not found in the first window.

12. A receiver incorporating the system of claim 7.

13. A method, comprising:
   correlating a synchronization pattern and a channel equalization pattern using their signs;
   determining where a channel equalization pattern starts when the channel equalization correlation is larger than the synchronization correlation; and
   establishing frame synchronization.

* * * * *